United States Patent [19]

Taft et al.

[11] Patent Number: 4,741,621

[45] Date of Patent: May 3, 1988

[54] GEOMETRIC SURFACE INSPECTION SYSTEM WITH DUAL OVERLAP LIGHT STRIPE GENERATOR

[75] Inventors: Jeffrey D. Taft, Murrysville; James F. Ellison, Pittsburgh, both of Pa.

[73] Assignee: Westinghouse Electric Corp., Pittsburgh, Pa.

[21] Appl. No.: 897,473

[22] Filed: Aug. 18, 1986

[51] Int. Cl.$^4$ ............................................. G01B 11/24
[52] U.S. Cl. ................................... 356/376; 356/394; 356/398; 356/237; 358/106; 358/107
[58] Field of Search ............... 356/376, 394, 398, 237; 358/106, 107

[56] References Cited

U.S. PATENT DOCUMENTS

| | | | |
|---|---|---|---|
| 4,111,557 | 9/1978 | Rottenkolber et al. | 356/394 |
| 4,498,778 | 2/1985 | White | 356/376 |
| 4,652,133 | 3/1987 | Antoszewski et al. | 356/376 |
| 4,683,493 | 7/1987 | Taft et al. | 358/101 |
| 4,705,401 | 11/1987 | Addleman | 358/107 |

Primary Examiner—Eugene R. LaRoche
Assistant Examiner—David Mis

[57] ABSTRACT

The present invention includes a surface inspection system with a single light source producing two light stripe sheets projected from different angles onto an inspected surface so that a combined light sheet produces a light stripe image with no shadows results. The two light stripe sheets are created by tangentially reflecting a laser beam off of separate cylindrical reflectors. The light stripe is detected by an imaging system, including a camera having a CCD image array, held at a fixed angle with respect to the light sheet which allows the two-dimensional curvature of the stripe to be detected. The two-dimensional light stripe image is converted into a digital image and processed by linear and logical digital filters that narrow the stripe down to two pixels wide. A coordinate extraction apparatus extracts the coordinates of the bottom row of the pixel image producing a digital representation of the light stripe curve. The sample curve is compared by a computer with a reference curve by obtaining the absolute value of the difference in height of points along the sample and reference curves after alignment and comparing the absolute value to an error or tolerance threshold. Any deviation beyond the fixed tolerance is reported as a surface irregularity defect.

15 Claims, 7 Drawing Sheets

GEOMETRIC SURFACE INSPECTION SYSTEM WITH DUAL OVERLAP LIGHT STRIPE GENERATOR

CROSS REFERENCE TO RELATED APPLICATIONS

This application is related to a copending U.S. application entitled COMPACT OPTICAL APPARATUS FOR TRACKING A PATH OF MOVEMENT OF A TOOL ALONG A LINE OF TRAVEL ON A WORKPIECE by Taft and Seymour, assigned to Westinghouse, having U.S. Ser. No. 876,520, filed June 20, 1986 now U.S. Pat. No. 4,683,493, and incorporated by reference herein.

BACKGROUND OF THE INVENTION

1. Field of the Invention

The present invention relates to a system for inspecting a geometric surface and, more particularly, to a surface inspection system which compares a reference surface curve to an actual surface curve to detect surface flaws by using a dual overlap light stripe generator to produce a complete stripe image on the geometric surface and a camera to capture the two-dimensional characteristics of the light stripe projected on the surface being inspected.

2. Description of the Related Art

In the past, light stripes have been generated by two methods which both use a laser or a collimated light beam as a source. One method projects the light beam through a cylindrical lense which defocuses the beam in a single dimension, that is, the cylindrical lense spreads the light beam in a single dimension. This method of creating a light stripe image produces a stripe that is subject to optical loss while passing through the cylindrical lense and that does not have sharp boundaries. The second method of producing a light stripe image is to electromechanically scan a beam onto a surface using a vibrating plane mirror or a rotating hexagonal prism. By vibrating the mirror or rotating the prism at high speed, the beam projected on the surface will appear as a stripe in an imaging system which has lag or integrating characteristics such as a TV camera. Light stripe systems of the above types use a single source to effectively project a single light sheet 10 onto a workpiece 12 and, as a result, produce shadowed regions 14, as illustrated in FIG. 1. These shadowed regions produce a blank in the strip image produced in a TV camera, making it impossible to obtain dimensional coordinates for the blank region. The drawbacks of this system also include the requirement for a bulky and failure-prone electromechanical projection system. These varying types of projection systems have been used in systems which track the movement of a tool along a line of travel on a workpiece making tool position corrections based on the geometry of the light stripe detected.

Prior art inspection systems have been ultrasonic immersion or contact devices which have a small measuring footprint and measure the thickness of a wall or other material by bouncing high frequency sound off the interior surfaces. Other methods of wall inspection for devices such as steam boilers include having a worker pass his hands over the interior surface of the boiler to detect flaws. The ultrasonic as well as the manual inspection methods, require a considerable amount of time to inspect an apparatus such as a steam boiler.

SUMMARY OF THE INVENTION

It is an object of the present invention to produce a light stripe with no shadows and which is capable of producing a two-dimensional image over the entire surface of an irregular surface being inspected.

It is another object of the present invention to produce a light stripe generator with no moving parts.

It is an additional object of the present invention to produce a surface inspection system that can determine defects in a surface passing thereby.

It is still another object of the present invention to provide a system that can detect the two dimensions of a light stripe on an irregular surface.

It is a further object of the present invention to produce an inspection system which compares a reference surface to an actual surface.

It is also an object of the present invention to allow surface discrepancies within a predetermined tolerance to pass inspection.

It is a further object of the present invention to produce an inspection system that can inspect the interior of a steam boiler rapidly and efficiently.

The above objects can be attained by a surface inspection system that includes a single light source producing two light stripe sheets projected from different angles onto an inspected surface so that a combined light sheet produces a complete light stripe image with no shadows. The light stripe is detected by an imaging system held at a fixed angle with respect to the light sheet and allows the two-dimensional curvature of the surface stripe to be detected. The two-dimensional light stripe image is processed by digital filtering and coordinate extraction apparatus that produces a digital representation of the image curve. The image curve is compared by a computer to a reference curve and deviations beyond a fixed tolerance are reported as surface irregularity defects.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
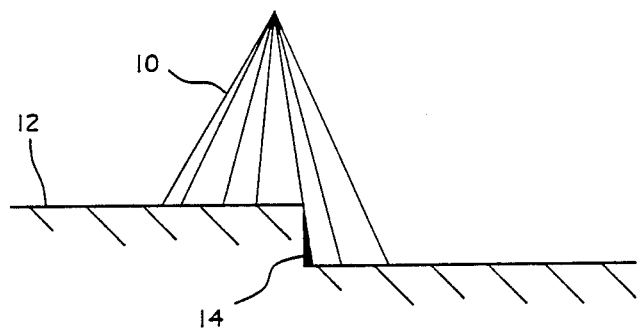
FIG. 1 illustrates the shadowing problems produced by light stripe generators of the prior art.
Figure 2:
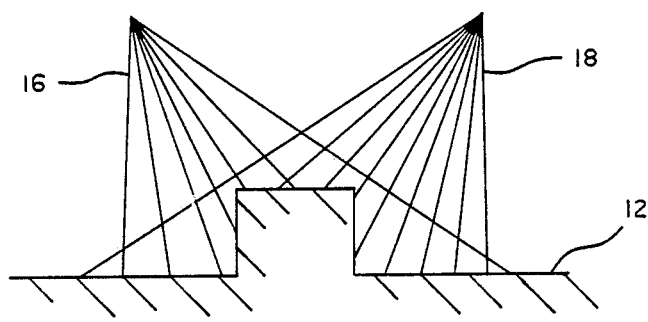
FIG. 2 illustrates the dual light sheet projection system of the present invention which eliminates surface shadows.

To eliminate shadowing produced by light sheet type light stripe projection systems, two light sheets can be produced which are co-planar and coincident and which project onto the surface to be examined from two different angles, as illustrated in FIG. 2. The shadowing produced by one sheet, for example, sheet 16, is automatically filled-in by the other sheet, for example, sheet 18, in a reflexive manner. The allowable separation between the sources producing the light sheets 16 and 18 depends on the shape of the surface on which the stripe is projected. The further the projection points for the light sheets 16 and 18 are apart, the shallower must be the irregularities in the surface.

Figure 3:
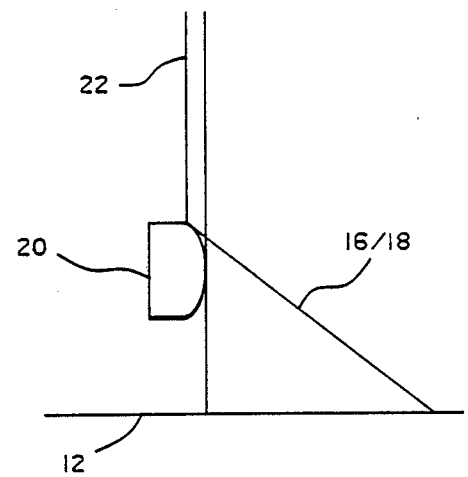
FIG. 3 depicts the apparatus and method for producing the light sheet.

To produce the light stripe sheets 16 and 18 of FIG. 2, a cylindrical reflector 20 is used to spread a laser beam 22 in a single direction, producing the light stripe sheet 16 or 18, as depicted in FIG. 3. The reflector 20 can be obtained from any optical supply house, such as Edmund Scientific, as a cylindrical lense or mirror having a high quality exterior surface. A laser beam or some other type of collimated light beam is projected at a very shallow angle with respect to the reflector 20 so that it grazes the lense tangentially, allowing a small portion of the beam 22 to pass directly by the reflector 22. The curved surface of the reflector 20 causes the angle of incidence and reflection of the beam to change across the cross section of the beam 22, spreading the beam 22 in what appears to be a stripe across the surface 12 to be inspected. Even though the projection of the spread beam 22 onto the surface 12 appears to produce a line, in actuality, an elliptical image is produced that has a very small minor axis.

Figure 4:
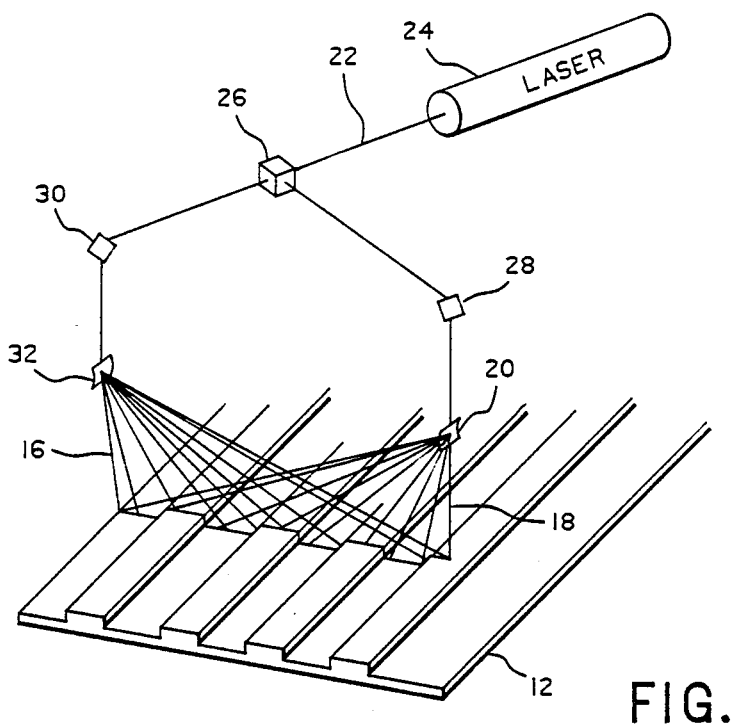
FIG. 4 illustrates the elements of the light sheet projection system of the present invention.

The laser beam 22 is produced by a laser 24, as depicted in FIG. 4, and split into two beams by a beam splitter 26 which can be a beam splitting prism available from any optical supply house. Once the split beam leaves the beam splitter 26, the pair of beams are reflected off planar mirrors 28 and 30, also available from an optical supply house, to produce a direction change which directs the beam perpendicularly toward the surface 12. The pair of beams then is reflected off of the cylindrical reflectors 20 and 32. The beam splitter 26, planar mirrors 28 and 30, and cylindrical reflectors 20 and 32 should be mounted in jigs or holders such that the light stripes produced by the mirrors 20 and 32 can be adjusted until they are coincident and coplanar. This can be accomplished by providing set screws or some other adjustment means which will allow the reflectors 20 and 32 to be adjusted in two dimensions.

In producing the light stripes, several factors must be considered to determine how far the fan of the beam spreads out. The factors that must be included are the radius or curvature of the reflector 20, the diameter of the laser beam 22 and the width of the field of view into which the light sheet is to be projected. A solid modeling program named EUCLID, available from Matra Datavision in France is suitable for modeling the optical elements and the beam to determine the characteristics necessary for the desired width of the light stripe. This program can run on one of the known computer aided design and computer aided manufacturing work stations or can be run on a Digital Equipment Corporation Microvax computer.

Figure 5:
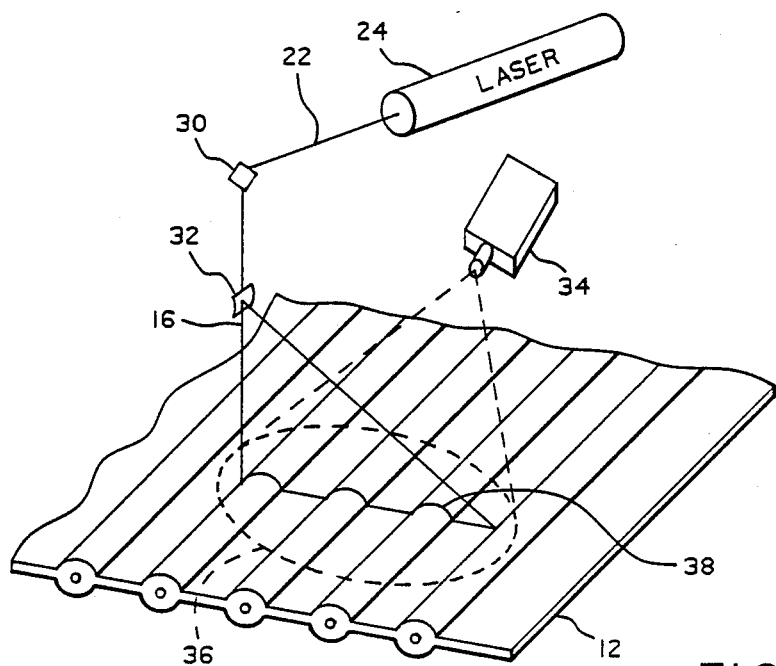
FIG. 5 illustrates the geometric relationship between the light stripe projection system and the light stripe detection system.

FIG. 5 depicts an image detector 34 such as a TV camera and its geometric relationship to the projection system. The camera 34 is capable of imaging a field of view 36 which encompasses the light stripe 38. The image detector 34 is held at a preferred angle of 60° with respect to the plane of the light sheet when inspecting devices such as the interior of a steam boiler. If a different device is being inspected, it is possible to adjust the angle and distance between the image detector 34 and the object being inspected and to compute a resulting resolution and accuracy that takes into account the resolution of the camera sensor, the optics of the camera and the angle $\phi$ between the light stripe and the camera, and the baseline distance b between the light plane and the principal axis of the camera.

Figure 6:
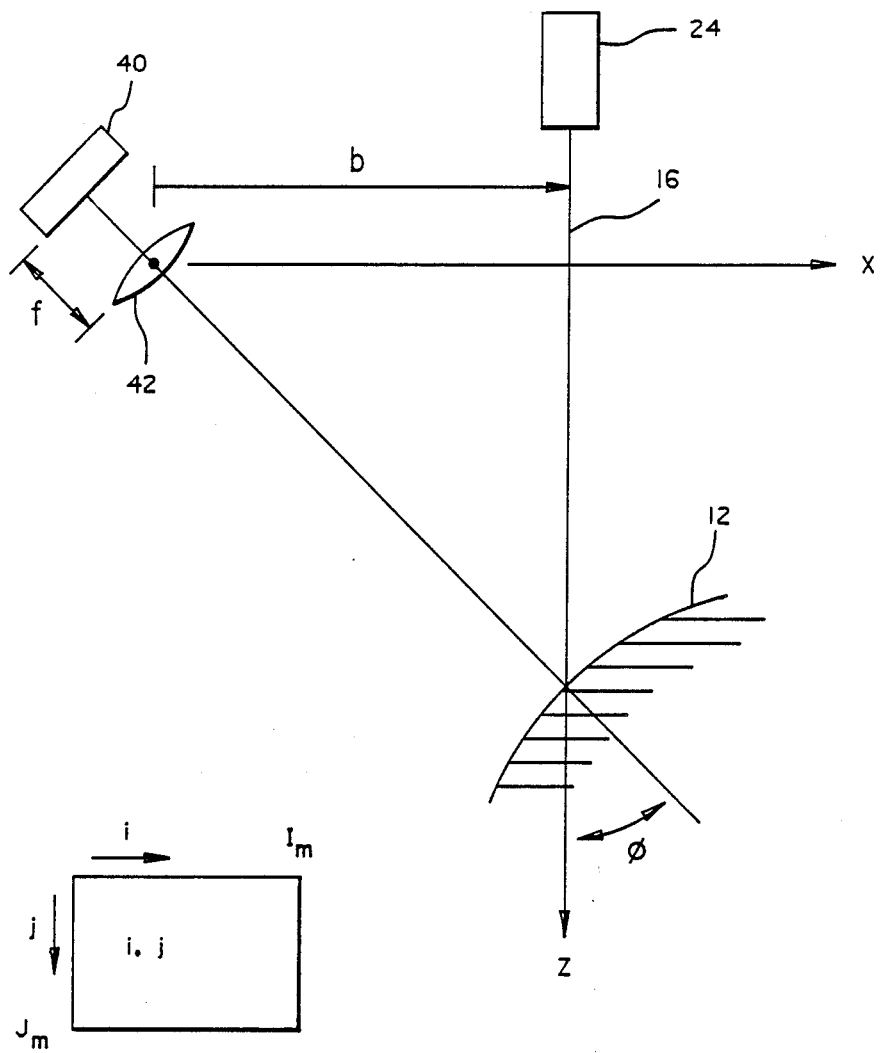
FIG. 6 illustrates the geometry for determining the resolution of the light stripe as detected by the detection system.

FIG. 6 depicts the distance b and angular relationship between the light sheet 16, the surface 12, the camera lense 40 and the image array 42 in the camera 34 which determine image resolution. The following equations define the relationship between the elements of the present invention and image resolution $$z = b \frac{(1 - \tan \phi)\left[\frac{k_j}{f}\left(\frac{J_m - J}{2}\right)\right]}{\tan \phi + \frac{k_j}{f}\left(\frac{J_m}{2} - J\right)} \quad (1)$$

$$Y = 0 \quad (2)$$

$$x = \frac{k_i}{f}\left(\frac{I_m}{2} - I\right) z \quad (3)$$

where b equals the baseline distance, $k_i$ equals the horizontal interpixel distance, $k_j$ equals the vertical interpixel distance, j equals is the vertical index, J equals the vertical image coordinate, $J_m$ equals the maximum vertical coordinate, i equals the horizontal index, I equals the horizontal image coordinate, $I_m$ equals the maximum horizontal coordinate and f equals the distance from the effective lens center to the focal plane. When the partial differentials of these equations are taken with respect to the image coordinates as set forth in the equations below, the resolution of the image at all points within the field of view can be computed:

$$\frac{z}{J} = \frac{\frac{bk_j}{f}[\tan^2 \phi + 1]}{\left[\tan \phi + \frac{K_j}{f}\frac{J_m}{2} - J\right]^2} \quad (4)$$

$$\frac{y}{J} = 0 \quad (5)$$

$$\frac{x}{J} = \frac{k_i}{f}\left(\frac{I_m}{2} - I\right)\frac{z}{J} \quad (6)$$

$$\frac{x}{I} = \left(\frac{-k_i}{f}\right) z_L \quad (7)$$

Figure 7:
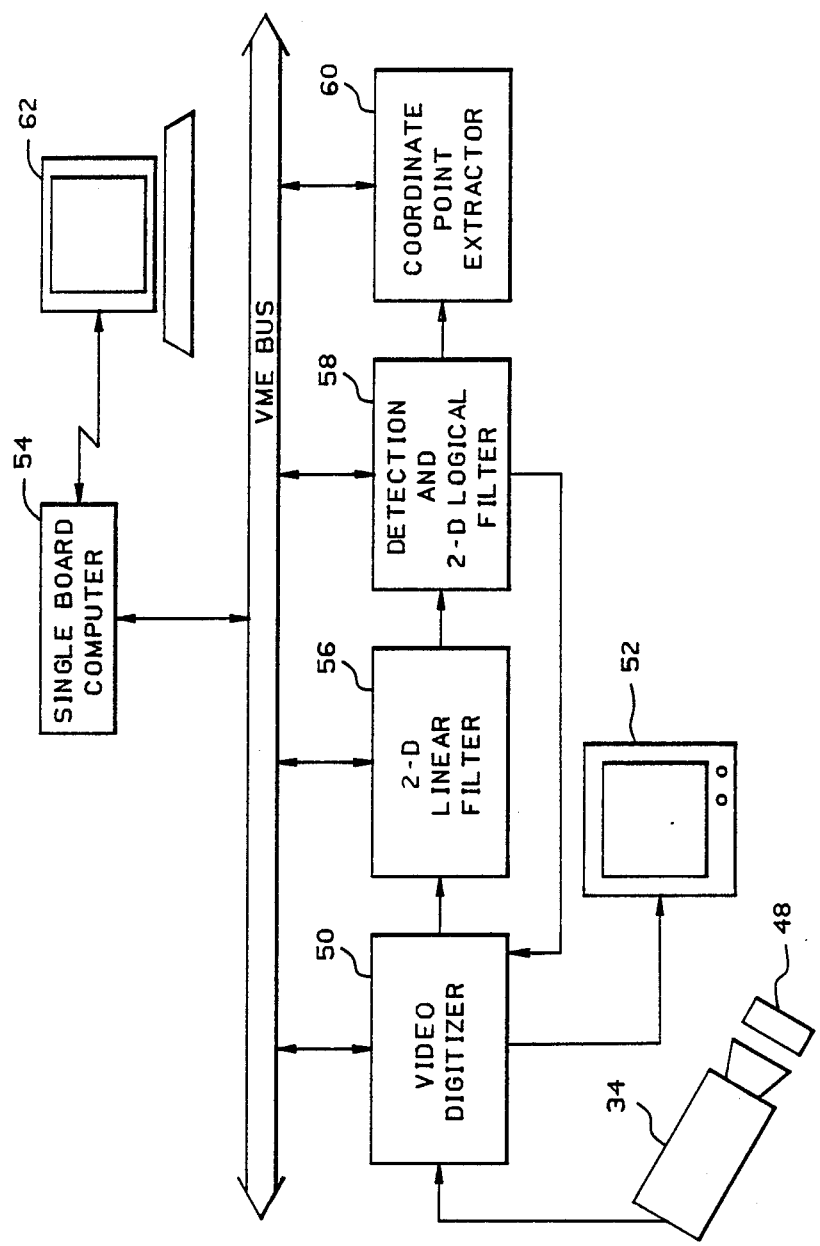
FIG. 7 illustrates the electronic components which process the light stripe image and compare it to a reference curve.

By adjusting the relationships between the variables, and as a result, the optics, an acceptable stripe image resolution throughout the field of view can be obtained. An angle of 60° and a baseline length of approximately 20 inches will result in a resolution of 15 mils. The stripe image is picked-up by camera 34 after passing through a narrow band optical filter 48. The narrow band filter 48 is designed to allow only light produced by the reflected laser beam to reach the camera. This filter, available from any optical supply house, removes ambient light noise in the inspection environment such as light reflected from other sources. The camera image is then processed by the system of FIG. 7. The camera 34 is preferably a solid state camera, which has a charge coupled (CCD) imaging device, such as is available from Sony and which generates an RS170 output signal which is the standard closed circuit TV signal format. The resolution of the preferred camera is 384 by 480 samples which is a close match to a standard TV bandwidth.

The TV image is processed by several special purpose single board devices that simplify the image so that a general purpose computer can analyze the digitized image. The camera signal is applied to a video digitizer 50 which turns the analog camera signal into a digital representation thereof. A suitable video digitizer 50 is available from Datacube, Inc. of Massachusetts and is called a Digimax digitizer. This single board digitizer 50 is particularly suitable to the present application because it precisely matches the resolution of the preferred TV camera, and as a result, no artifacts are introduced due to oversampling or undersampling. The video digitizer 50 is also capable of converting the digital image back into an analog signal suitable for display on TV monitor 52. The monitor 52 allows the inspection system operator to confirm that the image is being correctly detected. The video digitizer 50 must be initialized by a single board computer 54 to specify which of several input channels in the digitizer 50 are used for the TV camera signal. In addition, the video digitizer 50 must be loaded with a unit ramp look-up table which helps transform the video signal produced from the camera 34 into the video data output by the digitizer 50. The preferred digitizer 50 from Datacube is accompanied by an instruction manual which describes how to load a unit ramp. The unit ramp look-up table essentially provides a video gain of one for all of the image signals received by the digitizer 50. The use of a unit ramp table makes the video digitizer 50 transparent to the converted camera signal.

The output of the video digitizer 50 is applied to a two-dimensional linear filter 56 which is also available from Datacube as a single Video Finite Impulse Response board. The two-dimensional linear filter 56 filters a 3 by 3 window of data at the TV frame rate so that every video sample is processed by looking at that sample and its nearest eight neighbors. The filter 56 multiplies each of the nine samples by a coefficient to produce an output value that becomes the output sample for the center position in the image. The linear filter 56 must be loaded with nine filter coefficients by computer 54 where the coefficients for the image points surrounding the current sample are 0 and the coefficient for the current sample is 1. The loading of these particular coefficients produces a low pass filter which reduces the high frequency content and noise in the image, generated by such things as the camera 34. The result produces a light stripe image which is blurred or expanded to a very small extent, however, undesirable noise is removed.

The output of the linear filter 56 is applied to a single board detection and two-dimensional logical filter 58 also available from Datacube as a Systolic Neighborhood Area Processor. The detection and filter unit 58 performs detection by comparing the video image intensity at every sample point to a threshold intensity and any sample above the value of the threshold is designated a white element and everything below the threshold is designated as a black element. The threshold detection separates the stripe from the background. The threshold value is loaded into the detection and filter unit 58 by computer 54 and a preferred value of 60 in a possible range of 0 to 255 is loaded. Unit 58 also provides two-dimensional logical filtering that reduces the thickness of the stripe to two samples wide. The frame data from the TV camera 34 is produced as two sequential fields which are separated but must be interlaced because all the odd horizontal lines from the TV camera 34 arrive first and then the even lines as a drive group. The two-dimensional logical filter 58 takes the two sequential fields and examines a 3 by 3 neighborhood of samples in the same way that the linear filter 56 does, however, the logical filter 58 applies a logical or discrete transformation to the 3 by 3 neighborhood. The logical filter portion of the unit 58 must be loaded by computer 54 with masks which designate the logical transformation which occurs. The ten preferred masks were found by experimentation and the values for the masks will be set forth in detail when the operation of the computer 54 in the present invention is discussed. The set of masks essentially discards all of the curve image elements except the bottom two rows, resulting in a curve image which is 2 pixels wide.

The output of the detection and filter unit 58 is approximately 300 data points every 1/30 of a second. These data points are applied to a coordinate point extractor 60 which is available as a single board unit from Datacube as a Featuremax board. The coordinate point extractor 60 looks at the data from the detection and filter unit 58 and extracts the coordinates for those points that are white and stores them in a table. The coordinates of the stripe image are read by computer 54 every 1/30 of a second. The computer 54 unscrambles the separate horizontal odd and even data points and stores the vertical value of the coordinates in a one-dimensional array where the storage position of the vertical value is the horizontal coordinate value of the sampled point. That is, the horizontal image coordinate, of the image sample, is an array position counter that runs from 0 to 383 and the vertical coordinate of the image is the entry in the array position. As a result, if the values stored in the one-dimensional array are plotted, a one-dimensional graph would be produced that is the shape of the light stripe image as it appears to the TV camera 34. The process also thins the data to one pixel since only one sample is kept in each column. It is the lower sample of the two pixels in the image.

The computer 54 then compares the sample graph or actual image curve with a reference curve and produces error indicators whenever the reference curve points and the sample curve points do not match within a given tolerance. The reference curve can be created using a reference surface and the system described herein or a reference curve can be calculated independently. Before the comparison between the reference curve and the actual curve can actually be performed, the curves must be properly aligned. The alignment is performed by scanning the sample curve to find the highest point on the curve and then the sample curve is shifted to the right or to the left until the horizontal components of the highest point in the reference curve and the sample curve match. In most inspection systems, the camera 34 will be held at a fixed angle with respect to the traveling direction of the inspection system over the surface to be inspected and at a fixed height with respect to the surface being inspected. If the optical mounting system is incapable of maintaining such fixed relationships, the sample curve can be vertically adjusted before or after it is horizontally adjusted by shifting the vertical values in the sample curve in accordance with the difference between the vertical values of the highest points in the sample and reference curves. That is, the difference in height in the highest points in the curves can be used to offset or adjust the height of the sample curve. If the camera or surface is rotated with respect to the traveling direction, one of ordinary skill in the art can supply the transformation equations which will properly orient the sample curve with the reference curve so that the curves can be compared. In actual practice, rather than shifting the data points, a pointer to the first image point in the sample curve is adjusted to match the curves horizontally and a vertical adjustment value is stored which is later used to adjust the vertical value if necessary. The curve comparison operation is performed by subtracting the vertical value for the sample curve from the vertical value for the reference curve and comparing the absolute value to a threshold or tolerance. If the difference is larger than the tolerance, a flag is set in a corresponding memory location of a one-dimensional error array. This one-dimensional error array can be output to CRT 62 to pinpoint or illustrate height errors on the surface 12 or the original sample and reference curves can be reconstructed and displayed on a CRT with the defective portions of the sample curve highlighted. The single board computer 54 is essentially a 68010 processor by Motorola in a single board computer manufactured by Mizar, Inc of Minnesota. Any computer which has a clock frequency of 10 megahertz and storage capacity of 0.5 megabytes would be a suitable substitute as long as the bus was adapted to the Datacube cards.

Figure 8A:
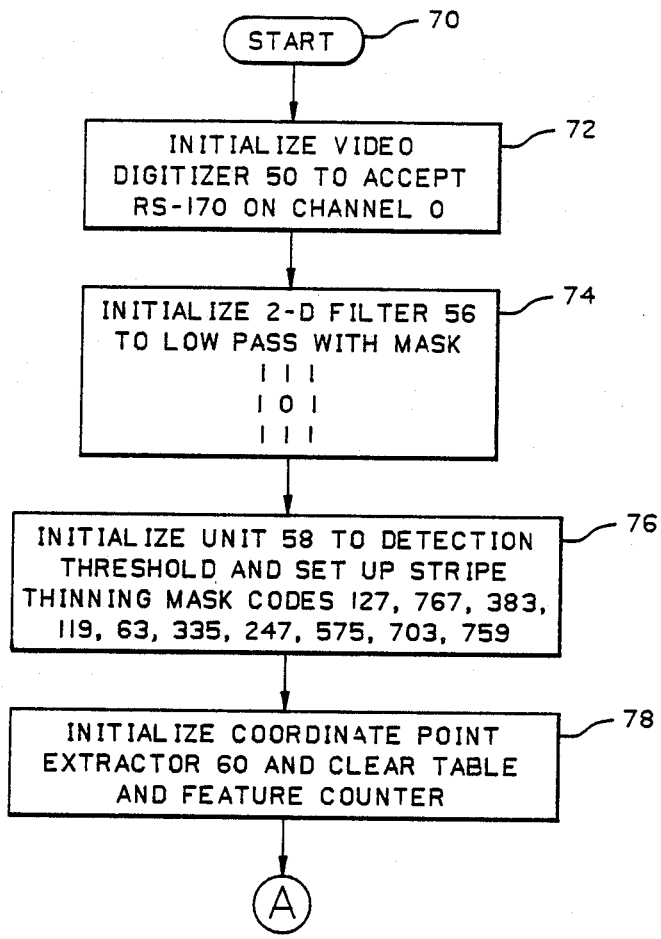
FIGS. 8, including 8A and 8B, depicts the control and component initialization routine for the single board computer 54 of FIG. 7.
Figure 8B:
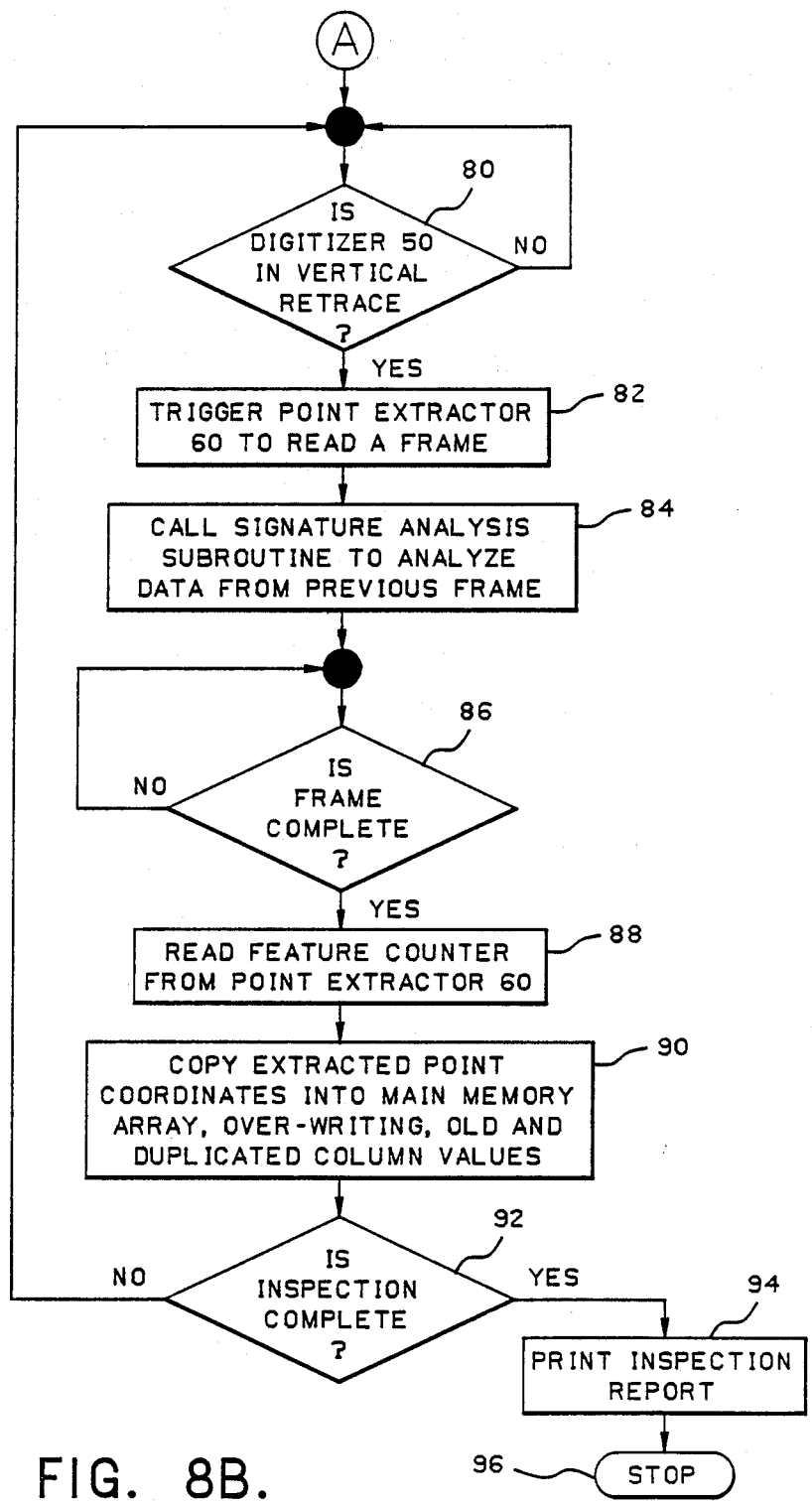

The computer 54 executes a main routine as depicted in FIGS. 8A and 8B. First 70, as previously discussed, the digitizer 50 is initialized 72 to accept the camera input on channel 0. The two-dimensional filter 56 is then initialized 74 as a low pass filter with the mask depicted in block 74 of FIG. 8A. The detection and two-dimensional logical filter unit 58 is then initialized 76 with the detection threshold of 60 and with the stripe thinning mask codes depicted in block 76 of FIG. 8A. The coordinate point extractor 60 is initialized 76 and the data table and feature counter therein are cleared 78. During this step the extractor 60 is placed in the coordinate extraction mode. Once the initialization is performed, the computer 54 waits 80 (FIG. 8B) for a signal from the video digitizer 50 that indicates that the camera 34 is in the vertical retrace interval. The vertical retrace interval signifies the beginning of a new video frame. The computer 54 could wait for an interrupt caused by the vertical retrace signal; however, the preferred method of determining when the vertical retrace signal occurs is to sample or poll the appropriate signal line from video digitizer 50. Once the vertical retrace is recognized, the coordinate point extractor 60 is triggered 82 to read a frame whereby the coordinate point extractor 60 begins independently collecting the coordinates for all the data points produced by the image. The vertical retrace signal is also used by the coordinate point extractor 60 to start coordinate extraction. Since the coordinate point extraction will require a full frame or 1/30 of a second, the present invention calls 84 the signature analysis subroutine for the previous frame. The details of the signature analysis subroutine will be discussed later with respect to FIG. 9. When the signature analysis subroutine returns, the computer 54 waits 86 for an end of frame signal which indicates that the extraction process is finished. When the sampling is finished, the feature counter in the coordinate point extractor 60 is read 88. The feature counter indicates how many coordinate points were actually produced by the coordinate point extractor 60. The computer 54 then copies 90 the extracted coordinate points into the one-dimensional main memory array by overwriting the old and duplicated column values. The computer 54 during the coordinate read operation unscrambles the odd and even lines as previously discussed by sorting on the horizontal component of the pixel coordinates. If the inspection is complete 92, an inspection report is printed 94 or displayed on CRT 62 and the processing stops 96 and, if inspection is not complete, the inspection loop is retraversed.

Figure 9:
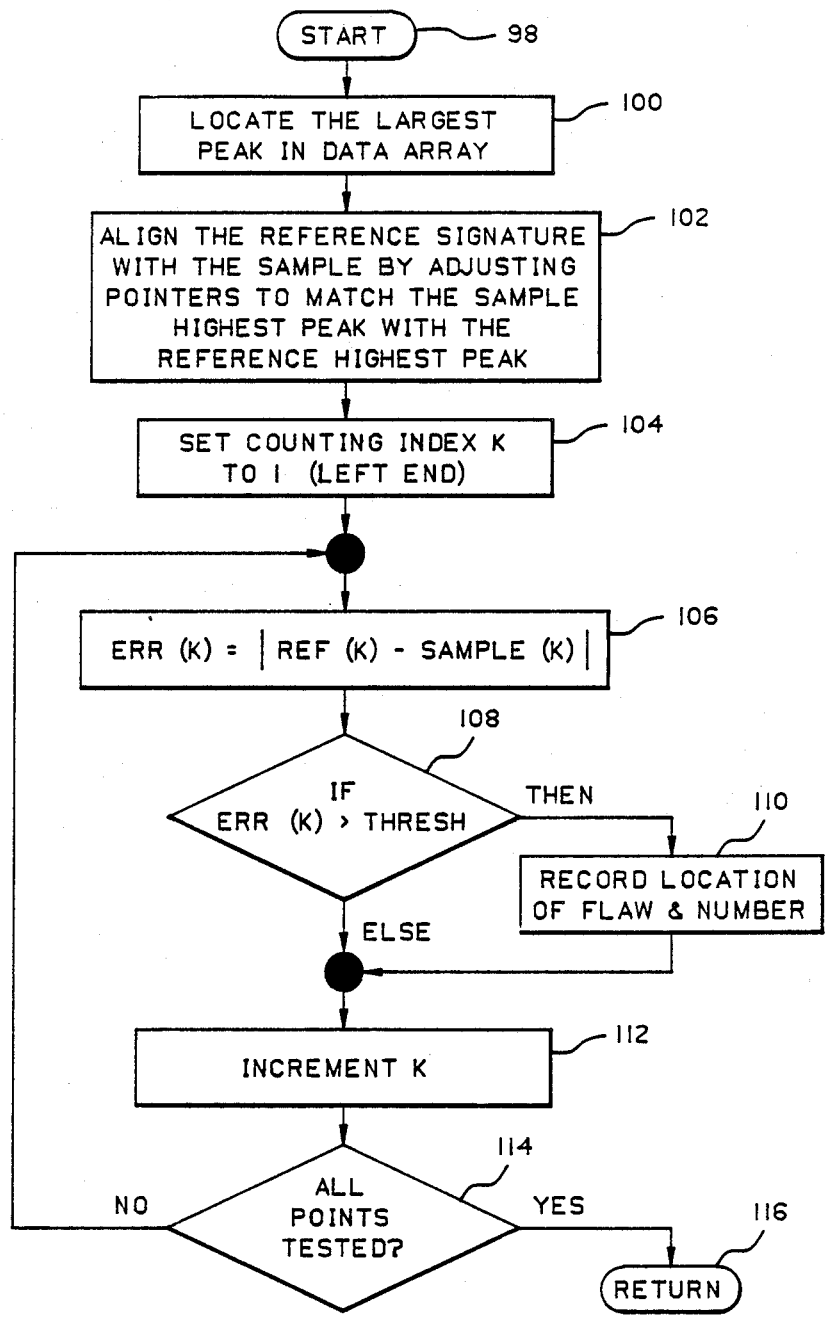
FIG. 9 is a flowchart of the signature analysis subroutine of the present invention.

The signature analysis subroutine which actually performs the comparison between the reference curve and the sample curve is illustrated in FIG. 9. As previously discussed, first the largest peak in the one-dimensional data array for the sample curve is found 100. The reference curve is then aligned 102 with the sample curve by adjusting the pointers to the first value in the sample curve so that the highest peaks in the sample curve and the reference curve match horizontally. The count index for comparing the vertical values of the curves, is then set 104 to 1 which is the left end of the curves. The amount of surface error is computed by subtracting 106 the value of the sample from the corresponding value of the reference curve and taking the absolute value of the result. If the error is greater than 108 a predetermined threshold, the location of the flaw and its value is stored 110. If the flaws are classified into various types of flaws based on the size of the error or its location, then a flaw number can also be recorded. The comparison index is incremented 112 and if all points have not been tested 114, the comparison loop is executed again, otherwise, the subroutine is finished comparing the sample data points with the reference points and control returns 116 to the main routine of FIG. 8.

The comparison of the reference curve with the sample curve occurs for every frame produced by the inspection system and thus, it is necessary to adjust the material flow rate passing by the inspection system to a rate which will allow errors at a desired flow rate resolution to be detected.

The many features and advantages of the invention are apparent from the detailed specification and thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

We claim:

1. A light stripe generator for an irregular surface being examined, comprising:
   first light sheet source means for projecting a first light sheet onto the surface as a first stripe; and
   second light sheet source means, separate from said first light sheet source means, for projecting a second light sheet onto the surface as a second stripe overlapping the second stripe, the first light sheet being coplanar with the first light sheet.

2. A generator as recited in claim 1, wherein said first light sheet source means creates the first stripe to fill in shadows on the surface created by the second light sheet source means and said second light sheet source means creates the second stripe to fill in shadows on the surface created by the first light sheet source means.

3. A generator as recited in claim 1, wherein the first and second light sheets are substantially perpendicular to the surface.

4. A light stripe generator for inspecting a combustion chamber wall, said generator comprising:
   a light source producing a source light beam;
   a beam splitter splitting the source light beam into first and second beams;
   a first planar mirror reflecting the first beam toward the wall;
   a first cylindrical reflector spreading the first beam into a first sheet projecting a first stripe onto the wall;
   a second planar mirror reflecting the second beam toward the wall; and
   a second cylindrical reflector separate from the first cylindrical reflector spreading the second beam into a second sheet projecting a second stripe onto the wall, the first sheet being coplanar with the second sheet and the first stripe overlapping the second stripe.

5. A generator as recited in claim 4, wherein the first and second bears strike the first and second cylindrical reflectors respectively tangentially.

6. A generator as recited in claim 4, wherein the first and second sheets are substantially perpendicular to the wall.

7. A generator as recited in claim 4, wherein said light source is a laser.

8. A generator as recited in claim 4, wherein said first and second cylindrical reflectors are cylindrical lenses.

9. A surface inspection apparatus, comprising:
   light stripe generation means for producing a surface light stripe on the surface; and
   inspection means for detecting the surface light stripe, producing a two dimensional surface light stripe image, comparing the surface light stripe image with a reference light stripe and producing an error indicator when the surface light shape image and the reference light stripe do not match.

10. An apparatus as recited in claim 9, wherein said inspection means comprises:
    a video camera imaging the surface light stripe and producing surface light stripe image signals; and
    conversion and comparison means for converting the surface light stripe image signals into the surface light stripe image and comparting the surface light stripe image with the reference light stripe to produce the error indicator.

11. An apparatus as recited in claim 10, wherein said light stripe generation means produces a light sheet substantially perpendicular to the surface and said video camera is positioned at an angle with respect to the light sheet.

12. An apparatus as recited in claim 11, wherein said angle is approximately sixty degrees with respect to the plane of the light sheet.

13. An apparatus, as recited in claim 10, wherein said conversion and comparison means comprises:
    digitizing means for digitizing the surface light stripe image;
    filter means for converting the digitized surface light stripe image into a pixel stripe image;
    coordinate extraction means for producing pixel coordinates of the pixels in the pixel stripe image; and
    difference means for computing a difference between the pixel coordinates and the coordinates of the reference light stripe and producing the error indicator for each difference greater than a threshold.

14. An apparatus as recited in claim 13, wherein said difference means shifts a horizontal comparison start pointer until a highest vertical coordinate value of the pixel and the reference coordinates match, produces an absolute value of a difference between the vertical coordinate values of the pixel and reference coordinates and produces an error flag when the difference is greater than the threshold.

15. A surface inspection apparatus, comprising:
    a dual overlap light stripe generator producing a complete light stripe on the surface;
    a camera imaging the light stripe;
    a video digitizer operatively connected to said camera and producing a digitized light stripe image;
    a two-dimensional linear filter operatively connected to said video digitizer and filtering the digitized light stripe image;
    a detector and two-dimensional logical filter operatively connected to said two-dimensional linear filter and isolating the light stripe;
    a coordinate point extractor operatively connected to said detector and two-dimensional logical filter and extracting stripe coordinates of the isolated light stripe; and
    a computer operatively connected to said coordinate point extractor, comparing the stripe coordinates with coordinates of a reference curve and flagging differences greater than a threshold.

* * * * *